United States Patent [19]
Komatsu et al.

[11] Patent Number: 4,801,651
[45] Date of Patent: Jan. 31, 1989

[54] METHOD OF MANUFACTURE OF THERMOPLASTIC ELASTOMER COMPOUNDS

[75] Inventors: Masato Komatsu, Hanno; Isao Baba, Iruma; Kiyotada Narukawa, Tokorozawa; Noboru Yamamoto, Tokyo; Tsuyoshi Kanai, Yokohama, all of Japan

[73] Assignee: Tonen Sekiyukagaku K.K., Tokyo, Japan

[21] Appl. No.: 159,586

[22] PCT Filed: Mar. 3, 1987

[86] PCT No.: PCT/US87/00446
§ 371 Date: Nov. 2, 1987
§ 102(e) Date: Nov. 2, 1987

[87] PCT Pub. No.: WO87/05308
PCT Pub. Date: Sep. 11, 1987

[30] Foreign Application Priority Data

Mar. 3, 1986 [JP] Japan .................. 61-44026

[51] Int. Cl.⁴ .............. C08L 23/26; C08L 23/16; C08L 15/02; C08L 9/00
[52] U.S. Cl. ...................... 525/195; 525/88; 525/194; 525/196; 525/197; 525/192; 525/211; 525/232; 525/237; 525/74; 524/525; 524/526
[58] Field of Search .............. 525/194, 195, 232

[56] References Cited

U.S. PATENT DOCUMENTS

| | | | |
|---|---|---|---|
| 4,130,534 | 12/1978 | Coran et al. | 525/232 |
| 4,247,652 | 1/1981 | Matsuda et al. | 525/232 |
| 4,593,062 | 6/1986 | Puydak et al. | 524/426 |
| 4,607,074 | 8/1986 | Hazelton et al. | 524/425 |
| 4,639,487 | 1/1987 | Hazelton et al. | 524/425 |
| 4,728,692 | 3/1988 | Sezaki et al. | 525/74 |

*Primary Examiner*—Carman J. Seccuro

[57] ABSTRACT

(A) polypropylene (10–90 weight part), (B) halogenated butyl rubber (90–10 weight part, (A)+(B)=100 weight part), (C) olefinic rubber (10–120 weight part) and (D) mineral oil softening agent (5–120 weight part) are heated in the presence of (E) metal oxide and/or metal chloride. To 100 weight part of the resulting composition are added, (F) polyolefin (100–600 weight part) and (G) vulcanizable olefinic rubber (50–500 weight part) and the components are mixed and heated in the presence of (H) organic peroxide. The resulting thermoplastic elastomer composition has good paintability, moldability, compatibility, low temperature impact strength, and especially high stiffness at elevated temperature.

1 Claim, No Drawings

METHOD OF MANUFACTURE OF THERMOPLASTIC ELASTOMER COMPOUNDS

BACKGROUND OF THE INVENTION

This invention is concerned with a method of manufacture of a partially crosslinked olefinic thermoplastic elastomer (TPE) compositions.

Although compounds comprising a polyolefin and a partially crosslinked rubber possess good properties as TPEs such as heat resistance, mechanical strength, flexibility, and elasticity, their flow properties are inferior to those of common plastics, and this has limited their use in large molded parts owing to problems such as "flow marks." To improve these problems, for example, Japanese Pat. No. 54-23702 teaches the use of compounds consisting of polyolefin and two types of rubber, partially crosslinked, and Japanese Pat. No. 56-15743 teaches a compound in which a polyolefin is blended with a polyolefin/rubber blend that has been treated with organic peroxides. Also Japanese Pat. No. 56-15740 teaches the methods of manufacture of such compounds.

Japanese Application No. 60-188419 discloses compositions in which the rubber phase includes a halobutyl rubber, which is vulcanized with metal oxides (MOx) and/or Metal Chlorides (MCl) and partially crosslinked in the presence of a polyolefin, and then additional polyolefin is added.

Although such TPE compounds have excellent properties such as processability, low temperature impact, paintability, flexibility, and mechanical strength, their stiffness at elevated temperatures was less than adequate compared to polyurethane elastomers. It is one object of the present invention to improve high temperature stiffness of this type of TPE, without loss in the characteristics of olefinic TPEs.

SUMMARY OF THE INVENTION

A method of manufacture of compositions in which polyolefin and a rubber phase comprising halobutyl rubber is partially crosslinked using MOx and/or MCl and are compounded further with a vulcanizable olefinic rubber, which is then crosslinked using organic peroxides.

Thus, a blend of (A) polypropylene 10-90 weight parts (pts.), (B) halobutyl rubber 90-10 pts. (wherein (A)+(B)=100 pts.), (C) olefinic rubber 10-120 pts., and (D) mineral oil softening agent 5-120 pts. are thermally treated with (E) MOx and/or MCl to crosslink the halobutyl rubber, to which blend of 100 pts. are then added, (F) polyolefin 100-600 pts., and (G) vulcanizable olefinic rubber 50-500 pts., which is then thermally treated with (H) an organic peroxide to crosslink the olefinic rubber.

DETAILED DESCRIPTION

(A) Polypropylene (PP)

PP suitable for use in this invention includes homopolymer or copolymer with ethylene, 1-butene, 1-pentene, 1-hexene or 4-methylpentene or other alpha-olefins with propylene as the main component, including random or block copolymers. Melt flow rate (MFR) is about 0.3-60 g/10 min, preferably 1-40, most preferably 3-30. Component A of the composition has the highest melting point of polyolefins, and imparts heat resistance and improved mechanical properties to the compound.

(B) Halobutyl Rubber

For purposes of this invention halobutyl rubber means halogenated butyl rubber. The halogen can be chlorine or bromine, usual content is 0.5-4.0 wt %. It is preferable that this component has a Mooney Viscosity, ML 1+8 (100° C.) of about 30-100 and 0.5-4.0 mol % unsaturation. Halobutyl rubber can be crosslinked using MOx and/or MCl, and exists as a dispersed crosslinked rubber phase, imparting abrasion resistance, impermeability and "anti-slip properties" to the compound.

(C) Olefinic Rubber

Rubber in which two or more of: ethylene, propylene, butene, 1-hexene, 4-methyl-1-pentene, etc. are copolymerized (e.g., ethylene propylene rubber, EPR) or rubber in which two of the above monomers (preferably ethylene and propylene) are polymerized with dicyclopentadiene, 1,4-hexadiene, cyclooctadiene, methylene-norbornene or ethylidenenorbornene (ENB) or conjugated dienes such as butadiene or isoprene. The preferred olefinic rubber has Mooney Viscosity, ML 1+8 (127°), of 5-300, Iodine Value up to 30, and 35-85 wt % ethylene content. Such olefinic rubber may be polyisobutylene, butyl rubber, etc.

The olefinic rubber is present in the compound as a non-crosslinked rubber, and imparts flexibility, flowability and also acts as a binder at the interface of (A) and (B), improving tensile strength and elongation. (

D) Mineral Oil Softener

Suitable materials include hydrocarbon petroleum fraction which lessens the hardness of vulcanized rubber. Included are paraffinic, naphthenic, and aromatic types. Among these, aromatic oils have a detrimental effect on paintability, and are unsuitable for use in materials which will be painted.

(E) Vulcanizing Agents

Metal oxides (MOx) including zinc oxide, magnesium oxide, lead oxide, calcium oxide, etc., but zinc oxide is preferred. Among metal chlorides (MCl) are zinc chloride and stannic chloride. It is also desirable to use magnesium oxide as an accelerator, to avoid corrosion of molds due to generation free halogen. The amount of vulcanizing agents relative to 100 parts of (A)+(B)+(C)+(D) should be about 0.2-10 parts, preferable 1 to 5 parts.

(F) Polyolefin

Polyolefin useful in this invention include homo- or copolymers of two or more of ethylene, propylene, 1-butene, 1-pentene, 1-hexene, 4-methyl-1-pentene, or copolymers of vinyl esters, unsaturated carboxylic acids or their derivatives with any of the above. Random or block copolymers are encompassed. Melt flow rate, MFR (at 190° C., but 230° C. for propylene-based polymers) should be in the range of about 0.1-20 g/10 min. for ethylene-based and about 15-60 g/10 min. for propylene-based polymers. Also, two or more of the above polyolefins may be combined. Preferred among the above are low density polyethylene (LDPE), linear low density polyethylene (LLDPE), medium-density polyethylene (PE) or high density polyethylene (HDPE), polypropylene (PP), or random or block copolymers with propylene as the major component. The presence of polyolefin improves the flowability or paintability of the compounds of the present invention without detriment to rubber elasticity. Since (F) and (A) have a similar function, these components can be added in various ratios. However, the beneficial effect of (F) is particularly observed when it is used with the previously dynamically vulcanized blend of (A)–(D) (in other words heat treated with mixing in the presence of vulcanizing agents).

Vulcanizable Olefinic Rubber

Useful materials include olefinic rubber which can be crosslinked through mixing and heating to decrease or eliminate flow of the rubber. For example, ethylene propylene (EP) copolymer rubber (EPR), ethylene-butadiene copolymer rubber, ethylene-nonconjugated diene copolymer rubber, etc. are included. Among these, EPR and EP-ENB (ethylidene norbornene) rubber are preferred. The vulcanizable rubber should have a Mooney Viscosity of ML 1+8 (127° C.) of about 5–300 and an iodine value of less than 30. In the final composition, the vulcanizable olefinic rubber is present as a partially crosslinked rubber phase, improving stiffness at elevated temperature.

(H) Organic Peroxides

The organic peroxides useful for crosslinking of the olefinic rubber are those with a half-life decomposition temperature of 160°–220° C.; for example di-t-butyl peroxide, dicumyl peroxide, benzoylperoxide, 2,5-dimethyl-2,5-di-(t-butyl peroxy) hexane-3, 2,5-dimethyl-2,5-di(t-butyl peroxy) hexane. In addition, for the treatment with peroxide, it is desirable to use an accelerator such as p,p'-dibenzoylquinone dioxime. The organic peroxide is used to partially crosslink the composition of the vulcanizate treated with (E) together with the polyolefin and the vulcanizable olefinic rubber, giving improved high temperature stiffness. The accelerator is included for the purpose of carrying out the partial crosslinking reaction smoothly and uniformly.

(I) Other (Optional) Components

As necessary for the particular end use, other optional components can be added to the composition including oil-resistance enhancing nitrile rubbers or other synthetic or natural rubbers. Also, modified polyolefins reacted with unsaturated carboxylic acids or their derivatives, e.g., maleic anhydride, endo-bicyclo-(2,2,1)-5-heptene-2,5-dicarboxylic anhydride may be incorporated. Other components such as antioxidants, UV absorbers, metal aging retardants, antistatic agents, lubricating agents, electrical property improvers, process aids, flame-retardants or coloring agents and inorganic fillers such as talc, barium sulfate, mica, and calcium silicate fillers may be added as required. These may be added at any stage of the manufacturing process.

Ratios of Components

Ingredients are expressed on the basis of weight parts. The ratios of (A), (B), (C), (D), (E) are:
(A) 10–90 pts., preferably 20–70 pts.;
(B) 10–90 pts., preferably 30–00 pts.; with (A)+(B)=100;
(C) 10–120 pts., preferably 10–100 pts.,
(D) 5–120 pts., preferably 5–100 pts. Also, the incorporation of (D) in the Second Stage (to be defined below) is desirably 1–60 pts.

(E) The crosslinking agent should be used at 0.2–10 pts., preferably 1–5 pts., relative to 100 pts. of (A)–(D).

When (A) is less than 10 pts., the compounds lose mechanical strength and heat resistance is poor. When (A) is greater than 90 pts., hardness and compression set are high and elastomeric properties are lost.

When (C) is less than 10 pts., flexibility is low and flowability is poor. In addition, the compatibilization of (A) and (B) becomes poor. On the other hand, when (C) is greater than 120 pts., mechanical strength decreases and compression set increases.

When (D) is less than 5 pts., flexibility is inadequate and when (D) is greater than 120 pts., paintability becomes poor, mechanical strength decreases and the compounds become sticky.

The amounts of components (F) and (G) to be used with 100 pts. of the vulcanizate crosslinked with (E) are: (F) 100–600 pts., preferably 200–500, and (G) 50–500 pts., preferably 60–400 pts. The amount of (H) (organic peroxide) relative to 100 pts. of the partial vulcanizate (A-E)+(F)+(G) is: 0.005–1 pt., preferably 0.01–0.3 pts. The accelerator should be used at a level of 0.005–1 pt., preferably 0.01–0.4 pts. When (F) is less than 100, flowability and paintability are inadequate, while if (F) is greater than 600 pts., the flexibility and rubbery properties of the composition are lost. When (G) is less than 50 pts., flexibility and molding flowability are low, and in addition compatibilization with the partial vulcanizate from (E) is poor. On the other hand, when (G) is greater than 500 pts., mechanical properties decrease and compression set becomes large. When the amount of (H) is less than the above-mentioned lower bound, the crosslinking of the vulcanizable rubber is inadequate and good high temperature stiffness is not obtained. When (H) exceeds the high end of the range, the flowability of the compound decreases as the degree of crosslinking increases. It is not desirable for the accelerator to exceed the mentioned range because the crosslinking reaction proceeds too far, resulting in low flowability, and in addition unreacted agent remains in the compound, changing its physical properties.

The amounts of the other components should desirably be in the range 0–30 wt %.

Method of Manufacturing the Composition

First, (A), (B), (C), (D), and vulcanizing agent (E) (MOx and/or MCl), and other components as necessary, are mixed and thermally treated, i.e. blended in the melt. The blending should be done at a temperature at which all components melt/flow, usually 160°–250° C. and desirably 170°–220° C. for 1–10 min., desirably 3–5 min. In this way, a composition in which the dispersed component (B) only is selectively crosslinked is obtained.

The melt blending may be carried out in equipment such as pressure kneaders, Banbury Mixers, screw-type extruders, etc. (This operation is referred to as the First Stage.)

Next, (F), (G) and (H) (organic peroxide plus accelerator) are added to the blend and melt blending is carried out. For example, pellets of the above components can be premixed in a Henschel mixer, ribbon blender, etc., then melt blended in an extruder, Banbury or kneader, etc. At this time, various stabilizers, coloring agents, inorganic fillers, softening agents, etc. can be added as required. (This is referred to as the Second Stage).

In the composition produced by the method of this invention, (B) is partially crosslinked, so compatibility is excellent, and without loss of rubbery properties, the mechanical strength is high, and impact strength, especially at low temperature, is improved. In addition, due to the successive vulcanization with components (F) and (G), and the uniform incorporation of (I), heat resistance, paintability adhesion, flowability and gloss are improved. Thus, there are no flow marks in large molded parts, and products have good high quality gloss. The composition of the present invention can be processed easily using conventional techniques for TPEs, such as blow molding, extrusion or injection molding, etc.

The compounds of the present invention have excellent processability and a good balance of flexibility, strength, and heat resistance. Hence, they are especially suitable for use as materials for auto parts, such as rack and pinion boots, hoses, side moldings, spoilers, and bumpers.

EXAMPLES

Test Methods (1) MFR: JIS K7210 (wt. 2.16 kg, 230° C.).
(2) MI: JIS K7210 (wt. 2.16 kg, 190° C.).
(3) Tensile strength and elongation at break: JIS K7113.
(4) Bending modulus: JIS K7203.
(5) Izod impact: JIS K7110.
(6) Gloss: JIS K7105, measured on 60° plane.
(7) Heat deflection temperature: JIS K7207.
(8) Processability:
  (a) Conditions
    Inj. molder: Mitsubishi Natco 350 MV XL40
    Inj. molding temperature: 230° C.
    Inj. molding pressure: primary 800 kg/cm$^2$
    Inj. molding pressure: secondary 500 kg/cm$^2$
    Inj. time: 13 seconds
    Cycle: 38 seconds
    Gate: ride gate
    Part: 3×100×350 mm flat plate
  (b) Judgement
    Flow-marks O: none
    Flow-marks D: very little
    Flow-marks X: many, severe
(9) Paintability:
  (a) Primer method: After test piece was cleaned in trichloroethylene (TCE) vapor for one minute, primer ("Pla-gloss," Nippon Yushi Co.) was painted and treated at 120° C. for 30 minutes. Then, over this layer was painted upper coating ("Flexene 101," Nippon Paint Co.), and treated at 120° C. for 30 minutes.
  (b) Plasma method: After test piece was cleaned in TCE vapor for one minute, it was plasma treated (O$_2$ plasma, 1.0 KW×1.0 torr×60 seconds) and painted with an upper coating ("Flexene 101," Nippon Paint Co.), and treated at 120° C. for 30 minutes.
  (c) Evaluation
    Initial adhesion: according to JIS K5400 test, "tile."
    Resistance to warm water: Appearance and "tile" test after immersion in 40° C. water for 240 hrs.

(10) Gel Fraction: One g. of sample was placed in a 100 mesh gold screen and boiled in hot xylene for 12 hours. Then, gel fraction was determined as the remaining xylene insolubles after vacuum drying for 24 hours.

EXAMPLES 1-14, COMPARATIVE EXAMPLES (Comp. Ex.) 1, 2

Materials Used

Component (A) Propylene-ethylene block copolymer (MFR=15.0 g/10 min., ethylene 7 wt %), referred to as "PP-Block-1."
(B) Chlorobutyl rubber (ML 1+8 (100) 50, chlorine content 1%, 2 mol % unsat.), referred to as "CIIR."
(C) ENB-EPDM (ML 1+8 (127)=35. Iodine Valve=4.0, ethylene=65 wt %), referred to as "EPDM-1."
(D) Naphthenic process oil (viscosity - specific gravity coefficient=0.880), referred to as "softener."
(E) ZnO, MgO (halogen accelerator).
(F) Propylene-ethylene block copolymer, (MFR=40 g/10 min., ethylene content 7%), referred to as "PP-Block-2".
(G) ENB-EPDM (ML 1+8 (127° C.)=45, Iodine Valve=3, referred to as "EPDM-2"), EPR (ML 1+4 (100° C.)=24, ethylene content=73%), referred to as "EPR").
(H) Organic peroxide (Nippon Yushi Co., "Perhexyne 2,5B"), P,P'-dibenzoylquinone dioxime (accelerator).
Other: Talc (silane treated, avg. dia. 2.5 microns), EPDM rubber, (ML 1+8 (127) 45, iodine value=3, ethylene=65 wt %), referred to as "EPDM-2"); EPR (ML 1+4 (100)=24, ethylene 73 wt %), referred to as "EPR", MA - modified propylene-ethylene block copolymer (MA content 0.5 wt %), referred to as "CMPP"; acrylonitrile-butadiene rubber (ML 1+4 (100)=56, AN content=35%), referred to as "NBR".

Preparation of the Composition (A)–(D) and talc were combined in the proportions shown in Table 1, and to 100 pts. of the resulting composition 2 pts. zinc oxide (ZnO) and 0.5 pt. magnesium oxide (MgO) were added and melt blended in a Banbury Mixer at 170° C. for 3 minutes. The resulting composition was sheeted, cut, and pelletizied (Stage 1).

Next, to the pellets obtained in Stage 1 were added (F), (G), NBR, CMPP, and softening agent, in the proprotions shown in Table 1. To 100 pts. of this blend were added 0.1–0.3 pts. of organic peroxide and 0.12–0.36 pts. of vulcanization accelerator, premixing in a Henschel mixer and extruding in a twin-screw extruder at 200° C. to obtain the final product of the invention. The characteristics of each compound are shown in Table 1.

In addition, the paintability properties, both initial adhesion and warm water resistance were good at 100/100. For comparison, Table 1 also shows properties of Compounds (comparative examples) where the vulcanizate from Stage 1 was blended with PP-Block-2 and EPR or EPDM and thermally treated as in Example 1 in the absence of organic peroxide (see table).

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|

TABLE 1-continued

| | | | | | | | | | | |
|---|---|---|---|---|---|---|---|---|---|---|
| Stage 1 | | | | | | | | | | |
| PP-Block-1 (pts.) | 50 | 50 | 50 | 50 | 50 | 50 | 50 | 50 | 50 | 50 |
| CIIR (pts.) | 50 | 50 | 50 | 50 | 50 | 50 | 50 | 50 | 50 | 50 |
| EPDM-1 (pts.) | 100 | 100 | 100 | 100 | 100 | 100 | 100 | 100 | 100 | 100 |
| Softener (pts.) | 94 | 94 | 94 | 94 | 94 | 94 | 94 | 94 | 94 | 94 |
| Talc (pts.) | 19 | 19 | 19 | 19 | 19 | 19 | 19 | 19 | 19 | 19 |
| Stage 2 | | | | | | | | | | |
| PP-Block-2 (pts.) | 700 | 700 | 400 HDPE | 400 LLDPE | 700 | 700 | 700 | 700 | 1,565 | 1,565 |
| PP-Block-2 (pts.) | | | 300 | 300 | | | | | | |
| PP-Block-2 (pts.) | EPR | EPDM-2 | EPR | EPR | EPR | EPR | EPR | EPR | EPR | EPR |
| | | | | | 200 EPDM-2 | | | | 875 EPDM-2 | |
| PP-Block-2 (pts.) | 400 | 400 | 400 | 400 | 200 | 400 | 400 | 400 | 375 | 1,250 |
| Softening Agent (pts.) | 5 | 5 | 5 | 5 | 5 | — | 5 | 5 | 5 | 5 |
| Org. Peroxide (pts.) | 0.3 | 0.3 | 0.3 | 0.3 | 0.3 | 0.3 | 0.2 | 0.1 | 0.3 | 0.3 |
| Accel. (pts.) | 0.36 | 0.36 | 0.36 | 0.36 | 0.36 | 0.36 | 0.24 | 0.12 | 0.36 | 0.36 |
| Fundamental Properties | | | | | | | | | | |
| MFR (g/10 min.) | 6 | 5 | 6 | 7 | 6 | 5 | 10 | 15 | 14 | 12 |
| Flex. Mod. (kg/cm$^2$) | | | | | | | | | | |
| @ 23° C. | 2,800 | 3,000 | 3,000 | 3,100 | 3,000 | 2,800 | 2,800 | 2,900 | 2,800 | 2,900 |
| @ 80° | 1,150 | 1,200 | 1,180 | 1,080 | 1,170 | 1,140 | 1,050 | 1,000 | 1,140 | 1,180 |
| Tens. @ Break (kg/cm$^2$) | 110 | 130 | 130 | 125 | 130 | 115 | 85 | 87 | 95 | 105 |
| Elong. @ Break (%) | 300+ | 300+ | 300+ | 300+ | 300+ | 300+ | 120 | 130 | 300+ | 300+ |
| Room Temp. IZOD | NB | NB | NB | NB | NB | NB | NB | NB | NB | NB |
| (kg-cm/cm) @ −40° C. | 55 | 65 | 62 | 75 | 65 | 52 | 45 | 46 | 65 | 63 |
| Heat Distort. Temp. (°C.) | 60 | 62 | 63 | 62 | 62 | 60 | 55 | 55 | 60 | 61 |
| Gel Fraction (%) | 36 | 38 | 42 | 40 | 38 | 38 | 25 | 20 | 35 | 38 |
| Processability | | | | | | | | | | |
| Flow Marks | 0 | 0 | 0 | 0 | 0 | 0 | 0 | 0 | 0 | 0 |
| Gloss (%) | 32 | 30 | 35 | 40 | 32 | 30 | 33 | 35 | 40 | 40 |
| Paintability | | | | | | | | | | |
| Primer Method | 100/100 | 100/100 | 100/100 | 100/100 | 100/100 | 100/100 | 100/100 | 100/100 | 100/100 | 100/100 |
| Plasma Method | 100/100 | 100/100 | 100/100 | 100/100 | 100/100 | 100/100 | 100/100 | 100/100 | 100/100 | 100/100 |

| | Ex. 11 | Ex. 12 | Ex. 13 | Ex. 14 | Comparative Ex. 1 | Comparative Ex. 2 |
|---|---|---|---|---|---|---|
| Stage 1 | | | | | | |
| PP-Block-1 (pts.) | 50 | 50 | 60 | 40 | 50 | 50 |
| CIIR (pts.) | 50 | 50 | 40 | 60 | 50 | 50 |
| EPDM-1 (pts.) | 100 | 100 | 110 | 100 | 100 | 100 |
| Softener (pts.) | 94 | 94 | 94 | 94 | 94 | 94 |
| Talc (pts.) | 19 | 19 | 19 | 19 | 19 | |
| Stage 2 | | | | | | |
| PP-Block-2 (pts.) | 700 | 700 | 700 | 700 | 700 | 700 |
| PP-Block-2 (pts.) | EPR | EPR | EPR | EPR | EPR | EPDM-2 |
| PP-BLOCK-2 (pts.) | | | | | | |
| PP-Block-2 (pts.) | 200 | 400 | 400 | 400 | 400 | 400 |
| Softening Agent (pts.) | 5 NBR 200 | 5 CMPP 2 | 5 | 5 | — | — |
| Org. Peroxide (pts.) | 0.3 | 0.3 | 0.3 | 0.3 | — | — |
| Accel. (pts.) | 0.36 | 0.36 | 0.36 | 0.36 | — | — |
| Fundamental Properties | | | | | | |
| MFR (g/10 min.) | 5 | 8 | 7 | 5 | 6 | 5 |
| Flex. Mod. (kg/cm$^2$) | | | | | | |
| @ 23° C. | 3,100 | 3,000 | 2,900 | 2,900 | 3,400 | 3,200 |
| @ 80° | 1,250 | 1,200 | 1,190 | 1,150 | 890 | 840 |
| Tens. @ Break (kg/cm$^2$) | 112 | 120 | 115 | 109 | 98 | 102 |
| Elong. @ Break (%) | 300+ | 300+ | 300+ | 300+ | 300+ | 300+ |
| Room Temp. IZOD | NB | NB | NB | NB | NB | NB |
| (kg-cm/cm) @ −40° C. | 57 | 61 | 52 | 59 | 35 | 40 |
| Heat Distort. Temp. (°C.) | 60 | 60 | 62 | 58 | 50 | 52 |
| Gel Fraction (%) | 33 | 35 | 28 | 38 | 55 | 58 |
| Processability | | | | | | |
| Flow Marks | 0 | 0 | 0 | 0 | 0 | 0 |
| Gloss (%) | 34 | 38 | 36 | 30 | 35 | 33 |
| Paintability | | | | | | |
| Primer Method | 100/100 | 100/100 | 100/100 | 100/100 | 100/100 | 100/100 |
| Plasma Method | 100/100 | 100/100 | 100/100 | 100/100 | 100/100 | 100/100 |

NB = No Break.

What is claimed is:

1. A method of manufacture of thermoplastic elastomer comprising thermally blending (A) polypropylene 10–90 weight part, (B) halogenated butyl rubber 90–10 weight part, wherein (A)+(B)=100 weight part, (C) olefinic rubber 10–120 weight part in the presence of (E) metal oxide and/or metal chloride, and to 100 weight part of the resulting composition are added (F) polyolefin 100–600 weight part and (G) vulcanizable olefinic rubber 50–500 weight part and said components (A) through (G) are further mixed and heated in the presence of (H) organic peroxide.

* * * * *